(12) United States Patent
Kang et al.

(10) Patent No.: US 10,325,242 B2
(45) Date of Patent: Jun. 18, 2019

(54) METHOD AND SYSTEM FOR SHARING ACTIVITIES OF DEVICES

(75) Inventors: Sang Wook Kang, Gyeonggi-do (KR); Hee Seon Park, Seoul (KR); Il Hwan Choi, Gyeonggi-do (KR)

(73) Assignee: Samsung Electronis Co., Ltd (KR)

( * ) Notice: Subject to any disclaimer, the term of this patent is extended or adjusted under 35 U.S.C. 154(b) by 1182 days.

(21) Appl. No.: 13/594,302

(22) Filed: Aug. 24, 2012

(65) Prior Publication Data

US 2013/0054720 A1    Feb. 28, 2013

(30) Foreign Application Priority Data

Aug. 24, 2011 (KR) .................. 10-2011-0084663

(51) Int. Cl.
| | |
|---|---|
| G06F 15/16 | (2006.01) |
| G06Q 10/10 | (2012.01) |
| G06Q 50/00 | (2012.01) |

(52) U.S. Cl.
CPC ............ G06Q 10/10 (2013.01); G06Q 50/01 (2013.01)

(58) Field of Classification Search
None
See application file for complete search history.

(56) References Cited

U.S. PATENT DOCUMENTS

| | | | |
|---|---|---|---|
| 2003/0014491 A1 | 1/2003 | Horvitz et al. | |
| 2007/0198975 A1* | 8/2007 | Alnas ................ | G06F 8/60 717/168 |
| 2008/0032723 A1* | 2/2008 | Rosenberg ............ | G06Q 10/10 455/466 |
| 2009/0327885 A1 | 12/2009 | Aoki et al. | |
| 2010/0063969 A1 | 3/2010 | Kasargod et al. | |
| 2010/0082135 A1* | 4/2010 | Amidon ............ | G06F 17/30053 700/94 |
| 2010/0138416 A1 | 6/2010 | Bellotti | |
| 2010/0177696 A1 | 7/2010 | Jung et al. | |
| 2011/0126191 A1* | 5/2011 | Hughes ................ | G06F 8/61 717/178 |
| 2011/0167355 A1 | 7/2011 | Shelansky et al. | |
| 2011/0202430 A1 | 8/2011 | Narayanan et al. | |
| 2011/0288912 A1* | 11/2011 | McCrea ............... | G06Q 30/02 705/14.2 |

(Continued)

FOREIGN PATENT DOCUMENTS

| | | |
|---|---|---|
| KR | 1020050005751 | 1/2005 |
| KR | 1020100062940 | 6/2010 |

(Continued)

OTHER PUBLICATIONS

European Search Report dated Apr. 1, 2015 issued in counterpart application No. 12825853.0-1955.

*Primary Examiner* — John B Walsh
(74) *Attorney, Agent, or Firm* — The Farrell Law Firm, P.C.

(57) ABSTRACT

A method and system for sharing activities of devices enabling sharing of various Social Network Services (SNS) based user activities and enabling a shared activity to be directly performed by a user device by collecting, by a first device, information on activities performed by a user of the first device, providing, by the first device, the collected activity information for sharing, and performing, by a second device, an event depending on the shared activity information provided by the first device.

13 Claims, 13 Drawing Sheets

(56) References Cited

U.S. PATENT DOCUMENTS

2013/0054801 A1* 2/2013 Belchee ............... G06F 21/105
709/225

FOREIGN PATENT DOCUMENTS

| KR | 1020100083231 | 7/2010 |
| KR | 1020110037354 | 4/2011 |
| KR | 1020110059703 | 6/2011 |

* cited by examiner

FIG. 13

| 1310 | 1330 |
|---|---|
| HEADER FIELD | DATA FIELD |
| MESSAGE TYPE INDICATION USER IDENTIFIER | ACTIVITY INFORMATION TARGET SHARER INFORMATION TEXT INFORMATION |

METHOD AND SYSTEM FOR SHARING ACTIVITIES OF DEVICES

PRIORITY

This application claims priority under 35 U.S.C. § 119(a) to Korean Patent Application No. 10-2011-0084663, which was filed in the Korean Intellectual Property Office on Aug. 24, 2011, the entire disclosure of which is incorporated herein by reference.

BACKGROUND OF THE INVENTION

1. Field of the Invention

The present invention relates generally to a device supporting Social Network Services (SNSs) and, more particularly, to a method and system for sharing activities of devices wherein a list of activities performed by a first user of a first device can be provided to others for sharing and the first device can directly perform or obtain a selected activity on a shared activity list provided by another user.

2. Description of the Related Art

Recent advances in digital technology have enabled and popularized various devices that may be used for mobile communication and information processing, such as mobile communication terminals, personal digital assistants, electronic notes, smartphones and tablet personal computers. Such devices may provide not only basic functions related to voice calls and text messages but also various advanced functions related to video calls, scheduling, document editing, electronic mail, Internet access and social networking.

Specifically, with advances in social networking technologies, information sharing through SNSs is becoming more diverse. For example, in addition to text messages and media content such as photographs and moving images, location information may be shared among many users. SNSs are online communities for making personal connections, and may cover personal media and information sharing services such as Twitter®, MySpace® and Facebook®. Currently, many people use SNSs to routinely communicate with others or to locate and share information.

A user using a device may activate an SNS social plug-in such as a "Like" or "Share" button to initiate a sharing feature. Currently, various SNS-based applications and web pages provide social plug-ins for sharing, which enable a user to share current states with an application use or a web page use with other users in a social network environment.

As described above, a user using a device may enter a "Share" button in an application or webpage to notify current states of the user to another user. However, if a user performs the SNS-based application (or the web page) and ends the application without entering the "Share" button, to share information on the application, the user may have to perform the application again and enter the "Share" button.

Currently, a user may only be aware of shared information provided by another user, but cannot provide a function related to the information in the user device.

SUMMARY OF THE INVENTION

Accordingly, the present invention has been made to solve the above-mentioned problems occurring in the prior art and the present invention provides an effective activity sharing method and system that automatically collect user activities on a device and enable SNS-based sharing of the collected activities according to user selection.

According to an aspect of the present invention, there is provided an activity sharing method and system enabling a device of a user to present shared activities provided by another user through a social network service and to perform an event related to one of the presented activities.

According to an aspect of the present invention, there is provided an activity sharing method and system wherein a first device collects user activities and allows the collected activities to be shared through social network services according to user selection and a second device can automatically perform a selected one of the shared activities or install an associated entity depending upon executability of the selected activity.

According to an aspect of the present invention, there is provided an activity sharing method and system wherein a first device collects user activities and automatically sends information on the collected activities to a given network server and the server stores the received activity information and handles sharing of the activity information with at least one second device belonging to a category that is preset by the user of the first device so as to cover all users, a group of users or a specific user.

According to an aspect of the present invention, there is provided an activity sharing method and system wherein a network server collects various statistics on activities shared by users and produces statistical or recommended information including preferred activities of a specific user or preferred activities at a specific location.

According to an aspect of the present invention, there is provided an activity sharing method and system that support not only activity sharing between devices but also activity sharing between users for users utilizing multiple devices.

According to an aspect of the present invention, there is provided an activity sharing method and system that implement an optimal environment for SNS-based activity sharing between users utilizing devices to thereby increase user convenience and heighten usability and competitiveness of devices.

According to an embodiment of the present invention, there is provided a method for sharing activities of devices, including collecting, by a first device, information on activities performed by a user in the course of using the first device, providing, by the first device, the collected activity information for sharing, and performing, by a second device, an event depending on the shared activity information provided by the first device. According to an embodiment of the present invention, there is provided a method for sharing activities of devices, including collecting, by a first device, information on activities performed by a user in the course of using the first device, and sending the collected activity information for sharing to a server on a social network, making, by the server, activity information received from the first device available to a second device on the social network, and receiving, by the second device, shared activity information from the first device, and performing an event depending on the shared activity information.

According to an embodiment of the present invention, there is provided a method for sharing activities of devices, including collecting information on activities performed by a user in the course of using a device, and making the collected activity information available to an external device.

According to an embodiment of the present invention, there is provided a method for sharing activities of devices, including obtaining shared activity information from an external device, and performing an event depending on the shared activity information.

According to another embodiment of the present invention, there is provided a method for sharing activities of devices, including collecting information on activities performed by a user in the course of using a device, providing the collected activity information for sharing to an external device, obtaining shared activity information provided by the external device, and performing an event depending on the obtained activity information.

According to another embodiment of the present invention, there is provided a method for sharing activities of devices, including receiving, by a server, activity information to be shared from a user, and storing the received activity information, examining target sharer information set by the user having provided the activity information to be shared, and sending the received activity information to devices of one or more sharing users having a relationship with the providing user as indicated by the target sharer information.

According to another embodiment of the present invention, there is provided a system for sharing activities, including a first device collecting information on activities performed by a user in the course of using the first device and providing the collected activity information for sharing, and a second device obtaining shared activity information from the first device and performing an event on the obtained activity information.

According to another embodiment of the present invention, there is provided a device supporting Social Network Services (SNS), including a communication module sending and receiving activity information through a social network, a display unit displaying user interface screens for an activity list and events on activity information, and a control unit controlling a process of collecting information on activities of a user and providing collected activity information for sharing to an external device, and controlling a process of obtaining shared activity information provided by the external device and performing an event on the obtained activity information.

BRIEF DESCRIPTION OF THE DRAWINGS

The above and other aspects, features and advantages of the present invention will be more apparent from the following detailed description taken in conjunction with the accompanying drawings, in which:

FIG. 13 is a diagram illustrating a format of a sharing message according to an embodiment of the present invention.

Figure 1:
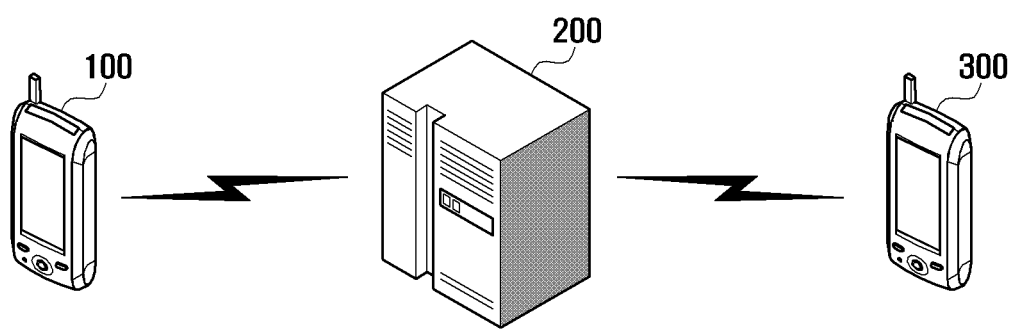
FIG. 1 is a diagram illustrating an overview of a system for activity sharing according to an embodiment of the present invention.

DETAILED DESCRIPTION OF EMBODIMENTS
OF THE PRESENT INVENTION

Hereinafter, various embodiments of the present invention are described in detail with reference to the accompanying drawings. The same reference symbols are used throughout the drawings to refer to the same or similar elements. Detailed descriptions of well-known functions and structures is omitted to avoid obscuring the subject matter of the present invention.

The present invention relates to a method and system for sharing activities enabling devices supporting Social Network Services (SNSs) to share user activities in a convenient and simple way.

According to an embodiment of the present invention, "activities" in a device such as a mobile terminal, may correspond to user actions in the course of using the device, such as execution of an application, playback or creation of content, playback or viewing of media content, visiting profile pages of other users, selection of news content, selection of an e-mail link, usage of communication like Near Field Communication (NFC), digital broadcast reception, and viewing web news. In a device such as a digital Television (TV), "activities" may correspond to user actions in the course of using the device, such as execution of an application, usage of communication through Internet access, broadcast reception and content purchase. In a device such as a refrigerator, "activities" may correspond to user actions in the course of using the device, such as putting food in a refrigerator and removing food from a refrigerator.

According to another embodiment of the present invention, a device may automatically collect and store information on user activities in user activity logs. Activity information may correspond to a usage history related to applications, content, profile pages, e-mail links, communications, digital broadcasts and web news. The device may share collected activity information with other devices according to user requests or settings. Specifically, to share activity information, the device may provide an activity list of collected activities and send the activity list to a server of a social network or directly to another device in response to a user request. A sharing message (described below) may be used to transmit activity information such as an activity list.

SNS users have defined relationships with respect to other users within a social network, such as "friendship" relations, "group" relations or "open" relations. A friendship relation corresponds to a one-to-one relation between two users, and may be formed by exchange of a request message and an acceptance message between the two users. A group relation corresponds to a one-to-many relation between users belonging to a group, and may be formed by exchange of a join request message and an acceptance message between the users. An open relation corresponds to a one-to-many relation between all users in the social network. A friendship relation and a group relation may be formed through server recommendations.

To initiate activity sharing, a user may specify another user as a sharing user, who is allowed to share the activity, in a specific relationship with the user. The device may compose a sharing message, which contains information on an activity selected by the user, information on at least one sharing user, identification information of the user, and a message type indicator indicating a sharing message. The sharing message may further contain additional information such as text provided by the user. The sharing message may be sent to the server of the social network.

For activity sharing in a social network, the user may share an activity with another user in a one-to-one manner ("friendship" relation), with a group of other users in a one-to-many manner ("group" relation), or with all other users in the social network in a one-to-many manner ("open" relation). That is, an activity selected by a user may be shared with one or more users or all users in a social network according to a selected sharing mode. When users in a friendship relation or group relation share an activity, the shared activity is visible only to the users in the friendship relation or group relation. That is, only sharing users specified in a sharing message may be allowed to access the shared activity.

The server of the social network may set the received activity information to be shareable with at least one second device of a sharing user. The second device provides the activity information received from the server or source device to the sharing user and may handle an event on the shared activity (for example, execution, automatic search, installation or activity recommendation) according to selection of the sharing user.

The server may provide statistical data to users in the social network and recommend specific activities based on shared activity information. The server may perform statistical analysis on the shared activity information related to users, groups, services and locations, and provide customized activity information based on the analysis results. For example, for a user, the server may provide information on shared activities most frequently used by friends of the user, by all other users, or at a specific location. The server may identify activities preferred by a user and recommend activity information to the user.

The configuration and operation of the system and device according to the present invention is described below with reference to the drawings. The configuration and operation thereof is not limited to the following description, and various changes and modifications are possible without departing from the scope of the present invention.

FIG. 1 is a diagram illustrating an overview of a system for activity sharing according to an embodiment of the present invention, and FIG. 13 is a diagram illustrating a format of a sharing message.

Referring to FIG. 1, the activity sharing system includes a first device 100, a server 200, and a second device 300. The server 200 and the second device 300 may be referred to as external devices. Although a single second device 300 is illustrated in FIG. 1, multiple second devices 300 may be present.

The first device 100 collects information on user activities such as application execution and stores the collected activity information. The first device 100 may share the collected activity information with an external device such as the server 200 or the second device 300 automatically or upon request.

The first device 100 may create an activity list of user activities in response to a user request, and send information on a selected activity in the activity list to the server 200 or the second device 300 in response to a sharing request. Alternatively, whenever new activity information is collected, the first device 100 may automatically send the collected activity information to the server 200 or the second device 300.

To send activity information to the server 200, the first device 100 may send a sharing message containing the activity information to the server 200. A sharing message format is illustrated in FIG. 13. That is, a sharing message from the first device 100 to the server 200 has a format illustrated in FIG. 13.

As illustrated in FIG. 13, a sharing message includes a header field 1310 and a data field 1330. The header field 1310 may contain a message type indication indicating a sharing message or regular message and a sender identifier indicating the sending user. The data field 1330 may contain activity information to be shared, target sharer information indicating a user permitted to use the activity information, and supplementary text information.

The target sharer information may be specified by a relation between the sending user and the sharing user. For example, when the user specifies a sharing user by a relation (friendship, group or open) to initiate activity sharing, the first device 100 may send a sharing message containing such relation indication as target sharer information to the server 200. That is, the target sharer information may be specified using information on the relationship between the sending user and the sharing user or using information on a category of sharing users such as "all friends."

The server 200 may receive various messages from the first device 100. Upon reception of a message, the server 200 may identify the message type and sender by checking the header field of the message. When the received message is a sharing message, the server 200 may extract activity information and target sharer information from the data field of the sharing message, identify sharing users by parsing the target sharer information, and grant a right to access the extracted activity information to the identified sharing users. For example, when the target sharer information is given by a category of sharing users such as "all friends", the server 200 identify users having a friendship relation with the sending user indicated by the header field, and grant a right to access the activity information to the identified users. Thereafter, a sharing user having an access right may access the activity information using a second device 300.

When a sharing message is sent according to a user request, target sharer information in the sharing message may indicate sharing users selected by the sending user. When the first device 100 automatically sends a sharing message, target sharer information may indicate sharing users specified by a preset relation in the first device 100. In addition, when a sharing message is automatically sent, the first device 100 may specify target sharer information according to the type of activity information to be shared. That is, target sharer information of a sharing message may be set according to the type of activity information to be shared.

When the first device 100 automatically sends a sharing message, target sharer information may be given by the server 200 (not by the first device 100). That is, the user of the first device 100 may provide default target sharer information to the server 200 in advance and target sharer information may be not present in the data field 1330 of a sharing message automatically sent by the first device 100.

Referring back to FIG. 1, the first device 100 may consider current network conditions when automatically sending activity information to the server 200. For example, when the first device 100 is currently connected to an IP network such as a Wi-Fi network, it may automatically transmit activity information. When the first device 100 is currently connected to a mobile communication network such as a 3G network requiring payment, it may transmit activity information according to a user request.

Activity information may be directly shared by devices including the first device 100 and second device 300 through the Internet or short-range communication (such as Bluetooth® or NFC) without an intermediary, such as the server 200. Here, a sharing message may contain only activity information to be shared, message type indication and identification information. Target sharer information may be omitted in a sharing message. The first device 100 may identify at least one recipient device corresponding to target sharer information specified by the user or set in advance when sending a sharing message upon request or automatically.

The server 200 is an SNS server in a given social network. Specifically, the server 200 manages activity information for various users. The server 200 may permit activity information to be shared between a user providing the activity information and other users associated with the providing user. The server 200 may receive activity information of a first user from the first device 100, and permit the received activity information to be shared by second devices 300 of one or more second users associated with the first user (namely, second users having a friendship, group or open relation with the first user).

The server 200 may provide shared activity information to sharing users in a "pull" scheme or a "push" scheme. The server 200 may transfer shared activity information provided by the first device 100 to the second device 300 in response to a request from the second device 300 (pull scheme). Whenever the first device 100 provides newly shared activity information, the server 200 may transfer the shared activity information to the second device 300 (push scheme).

The server 200 may derive various statistics regarding various activity information shared by users, and may provide statistical information and recommendation information based on preferred activities of a specific user or at a specific location. The server may perform statistical analysis on the shared activity information, and provide statistical activity information or recommend a particular activity.

The server 200 may perform statistical analysis on the shared activity information related to users, groups, services and locations, and provide activity recommendation information based on the analysis results. For example, for a user, the server 200 may provide information on shared activities most frequently used by friends of the user, by all other users, or at a specific location. The server 200 may identify activities preferred by a specific user and recommend customized activity information to the user.

The second device 300 may receive shared activity information from the first device 100 via the server 200 and provide the shared activity information to the second user. The second device 300 may obtain shared activity information from the server 200 according to a preset period or a user request (pull scheme). Alternatively, the second device 300 may obtain shared activity information when the server 200 automatically sends the shared activity information (push scheme).

The second device 300 may create an activity list based on shared activity information provided by an external device (such as the first device 100 or the server 200) and collected activity information regarding activities performed by the second user of the second device 300, and handle an event on a selected activity of the activity list in response to a request from the second user.

For example, when an activity provided by an external device is selected from the activity list, the second device 300 determines executability of the selected activity. When the selected activity is executable, the second device 300 may execute the activity and display an execution screen. When the selected activity is not executable, the second device 300 may provide at least one of guide information to obtain the selected activity and information recommending a different activity similar to the selected activity. When the second user selects one of the guide information and recommendation information, the second device 300 may download and execute a corresponding activity. When the selected activity is related to non-executable content such as a photograph, moving image, e-book or URL, the second device 300 may identify a player by referring to corresponding activity information provided by the external device and execute the identified player to play back the selected activity. When the identified player is not executable, the second device 300 may output a corresponding notification and provide guide information for obtaining a suitable player.

Figure 2:
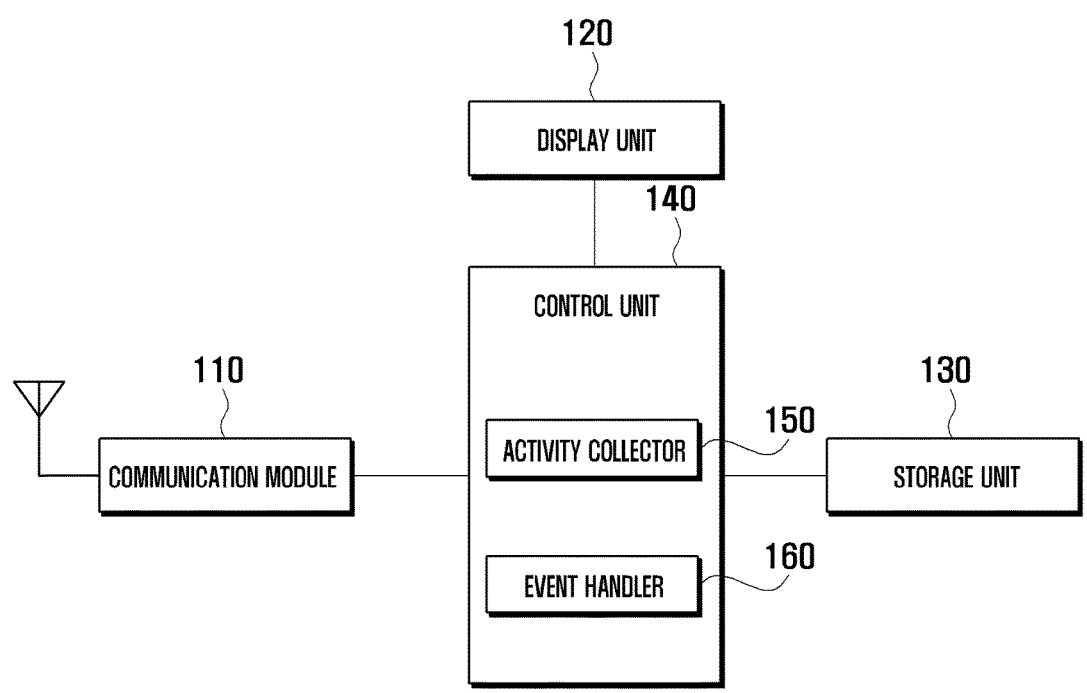
FIG. 2 is a block diagram illustrating a device according to an embodiment of the present invention.

FIG. 2 is a block diagram illustrating a device according to an embodiment of the present invention. The configuration of the device in FIG. 2 is applicable to both the first device 100 acting as a provider or a sender and the second device 300 acting as a consumer or a recipient.

Referring to FIG. 2, the device includes a communication module 110, a display unit 120, a storage unit 130, and a control unit 140. Although not illustrated, the device may further include various components, such as an audio processing unit including a microphone and a speaker, a camera module for taking photographs, a digital broadcast reception module for Digital Multimedia Broadcasting (DMB) or Digital Video Broadcasting (DVB), a camera module for capturing still and moving images, a short-range communication module supporting Bluetooth®, Infrared Data Association (IrDA), Radio Frequency Identification (RFID) or NFC communication, a radio frequency unit supporting voice, video and data calls based on mobile communication, a touch pad or touchscreen for entering touch-based input, and a battery for power supply.

The communication module 110 provides Internet services based on a wireless local area network (WLAN). Specifically, the communication module 110 connects to the server 200 of a social network, and may send activity information to be shared by the user to the server 200 or receive shared activity information provided by another user from the server 200. To support direct sharing of activity information between two devices, the communication module 110 may also support short-range communication. The communication module 110 connects to an external device through short-range communication, and may send activity information of the user to the external device or receive activity information provided by another user from the external device.

The display unit 120 may display screen data related to states and operation of the device, such as the home screen or various application screens of the device. The display unit 120 may be implemented using Liquid Crystal Display (LCD) devices, Light Emitting Diodes (LED), Organic LEDs (OLED) or Active Matrix OLEDs (AMOLED). The display unit 120 may have a touch-based input interface, such as a touchscreen to support touch-based user interaction, and may generate an input signal corresponding to a user interaction and send the input signal to the control unit 140.

The display unit 120 may display one of activity information collected by the device and shared activity information provided by an external device. The display unit 120 displays the activity information in the form of a list. The display unit 120 also displays the activity information using a slide show feature or icons. The activity information may be represented as an activity list. The display unit 120 displays an event handling screen to process a selected item from the activity list. The display unit 120 displays activity information (or activity lists) in portrait mode or in landscape mode depending on the orientation of the device, and transitions between portrait mode display and landscape mode display depending on rotation of the device.

The storage unit 130 stores various applications and associated data related to operation of the device. The storage unit 130 may be composed of one or more nonvolatile memories such as a Read Only Memory (ROM) and flash memory, or one or more volatile memories such as a Random Access Memory (RAM). The storage unit 130 may temporarily or permanently store the operating system of the device, programs and data related to display control operation of the display unit 120, programs and data related to input control operation using the display unit 120, programs and data related to activity sharing of the device (for example, collecting activity information and transmitting collected activity information to the outside), and programs and data related to handling of events on a shared activity.

Specifically, the storage unit 130 may store activity information collected by the device. The storage unit 130 may also store various setting information for activity sharing functions. The setting information may be related to options for collecting activity information, options for sharing collected activity information, options for handling duplicate items in collected activity information, options for handling events on shared activities, and options for installing and executing an activity obtained from an external device.

The options for collecting activity information may include collecting information on all activities performed by the device, collecting activity information according to preset user conditions such as execution count, time or location, and collecting information on only pre-specified activities. The options for sharing collected activity information may include automatic sharing of newly collected activity information, and activity sharing upon request. The options for handling duplicated items in collected activity information may include retaining the duplicated items in order of execution dates and times, and retaining only the most recently collected item. The options for duplication handling may be set differently for individual activities.

The control unit 140 controls the overall operation of the device. Specifically, the control unit 140 controls functions related to activity sharing and handling of events regarding shared activities. For example, the control unit 140 collects information on activities of the user in the course of using the device, stores the collected activity information in the storage unit 130, and displays the collected activity information as an activity list (using a list format, a slide show feature or icons) in response to a user request. The control unit 140 may send one or more selected items of the activity list to the server 200 or an external device through the communication module 110. The control unit 140 may receive activity information of another user from the server 200 or an external device, and provide the received activity information as an activity list (using a list format, a slide show feature or icons) in response to a user request. The control unit 140 processes events on a selected activity of the activity list. The control unit 140 includes an activity collector 150 and an event handler 160 to perform these functions.

The activity collector 150 collects information regarding activities (such as playback, viewing, creation and execution) performed by the user of the device, and store the collected activity information in the storage unit 130.

When an activity selected by the user from an activity list provided by an external user, the event handler 160 determines executability of the selected activity and performs event handling according to the determination result. For example, to determine executability of an activity, the event handler 160 checks a type of the activity and perform different operations depending upon whether the activity is related to an application intended for execution or is related to content intended for playback.

When the selected activity is related to an application intended for execution, the event handler 160 checks whether an activity identical to the selected activity is present in the device. When an activity identical to the selected activity is present, the event handler 160 determines that the selected activity is executable and may execute the identical activity. When an activity identical to the selected activity is not present in the device, the event handler 160 provides recommendation information for obtaining an activity identical or similar to the selected activity. The event handler 160 performs subsequent operations to obtain an activity identical or similar to the selected activity according to user decision on the recommendation information.

When the selected activity is related to content intended for playback, the event handler 160 determines executability of the selected activity depending on the availability of a player application capable of playing back the selected activity. The event handler 160 checks whether a player having played the selected activity is present in the external device having provided the corresponding activity information. When the selected activity is determined to be executable (i.e., a player is available), the event handler 160 executes the selected activity (i.e., executes the player). When the selected activity is determined not to be executable, the event handler 160 may automatically search an external server to find a suitable player and install the found player, or may provide recommendation information for obtaining a suitable player application.

Additionally, the control unit 140 controls various regular operations of the device. For example, when an application is activated, the control unit 140 controls execution and screen display of the application. The control unit 140 receives various input signals generated by the touch-based input interface and controls operations according to the input signals. The control unit 140 controls data transmission and reception based on wired or wireless communication.

The device according to the present invention illustrated in FIG. 2 may be any information and communication device or multimedia device capable of receiving Internet services and supporting SNS-based activity sharing, such as a mobile communication terminal based on communication protocols supporting various communication systems, a tablet personal computer, a smart phone, a Portable Multimedia Player (PMP), a media player, a portable game console, a digital television set such as a smart TV, Digital Signage (DS), a Large Format Display (LFD), a refrigerator, a digital camera, a laptop computer, a desktop computer, or a Personal Digital Assistant (PDA).

Figure 3:
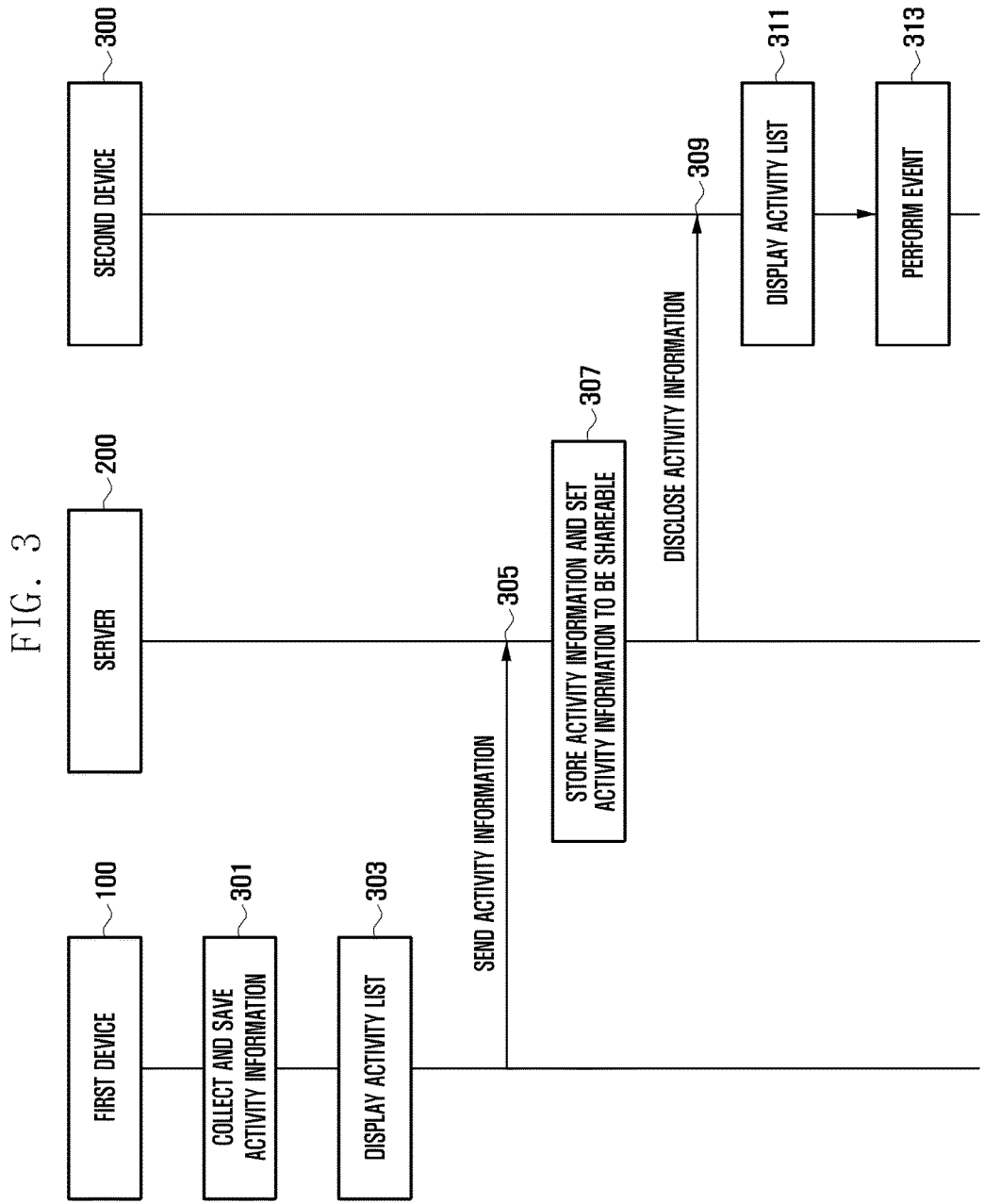
FIG. 3 is a flow diagram illustrating a procedure for activity sharing in the system according to an embodiment of the present invention.

FIG. 3 is a flow diagram illustrating a procedure for activity sharing in the system according to an embodiment of the present invention.

Referring to FIG. 3, the first device 100 collects information on user activities and stores the collected activity information in step 301. Activity information may be related to activities performed by the user in the course of using the first device 100 such as actions associated with execution of applications, access to websites, playback or viewing of media, and creation or acquisition of content. Collected activity information may be stored.

In response to a user request, the first device 100 displays an activity list using a list format, a slide show feature or icons based on the collected activity information in step 303. In response to a user request, the first device 100 sends information regarding one or more activities selected from the activity list to the server 200 in a social network in step 305. A sharing message may be used to send activity information and may contain target sharer information specifying a sharing user who is allowed to share the activity information. The target sharer information in a sharing message may be set to specify a category of sharing users covering a specific user ("friendship" relation), a group of users ("group" relation) or all other users ("open" relation) with respect to a relationship with the user of the first device 100. That is, activity information in a sharing message may be shared by a friend, a group of users or by all other users.

According to one embodiment of the present invention, the user of the first device 100 registers target sharer information in the server 200 in advance. When the user of the first device 100 makes a sharing request for activity information, the server 200 may permit sharing users specified by the registered target sharer information to share the activity information.

Upon reception of the activity information from the first device 100, the server 200 stores the activity information and sets the activity information to be shareable in step 307. Specifically, based on target sharer information preset by the user of the first device 100, the server 200 may allow a specific friend, a group of users or all other users to share the activity information. As such, sharing user rights to access shared activity information may be specified by user settings.

The server 200 discloses the shareable activity information according to a request from the first device 100 in step 309. According to the sharing mode preset by the user of the first device 100, the server 200 may disclose the activity information to a specific friend, a group of users or all other users for sharing. In FIG. 3, it is assumed that the second device 300 utilizes shared activity information provided by the first device 100.

The server 200 delivers shared activity information provided by the first device 100 to the second device 300 in a pull scheme or a push scheme. That is, the server 200 may transfer shared activity information provided by the first device 100 to the second device 300 in response to a request from the second device 300 (pull scheme). Alternatively, whenever the first device 100 provides newly shared activity information, the server 200 may automatically transfer the shared activity information to the second device 300 (push scheme).

The second device 300 displays the shared activity information received from the first device 100 via the server 200 in step 311. The second device 300 displays an activity list containing shared activity information in response to a user request. The activity list may include information on activities collected from the second device 300 and shared activity information provided by another device such as the first device 100. As described above, the second device 300 obtains shared activity information in two schemes. That is, the second device 300 may receive shared activity information from the server 200 according to a preset period or a user request (pull scheme). When the server 200 obtains new activity information for sharing and automatically sends the shared activity information, the second device 300 receives the shared activity information (push scheme).

The second device 300 handles an event on a selected activity of the activity list in response to a user request in step 313. The second device 300 determines executability of the selected activity (such as an application or content). To determine executability of an activity, the second device 300 identifies the type of the activity by checking whether the activity is related to an application intended for execution or is related to content intended for playback.

When the selected activity is related to an application intended for execution, the second device 300 checks whether an application associated with the selected activity is present. When an application associated with the selected activity is present, the second device 300 determines that the selected activity is executable, and executes the application and displays execution results. When the selected activity is determined not to be executable, the second device 300 automatically searches an external server (such as the server 200, a market server, or a content server) for an application associated with the selected activity, download the found application, and installs the downloaded application. Alternatively, the second device 300 provides information necessary for obtaining an application associated with the selected activity (for example, application market information) or recommendation information for a similar or higher version application.

When the selected activity is related to content intended for playback, the second device 300 determines executability of the selected activity depending on the availability of a player application capable of playing back the content indicated by the selected activity. The second device 300 checks whether a player associated with the selected activity is present in an external device having provided the corresponding activity information. When the selected activity is determined to be executable (i.e., a player is available), the second device 300 executes the selected activity and displays execution results. When the selected activity is determined not to be executable (for example, a player is unavailable from the external device), the second device 300 may automatically search an external server (such as a market server) for a player associated with the selected activity, download the found player, and install the downloaded player. Alternatively, the second device 300 may provide information necessary for obtaining a player associated with the selected activity (for example, application market information) or recommendation information for a similar player.

Figure 4:
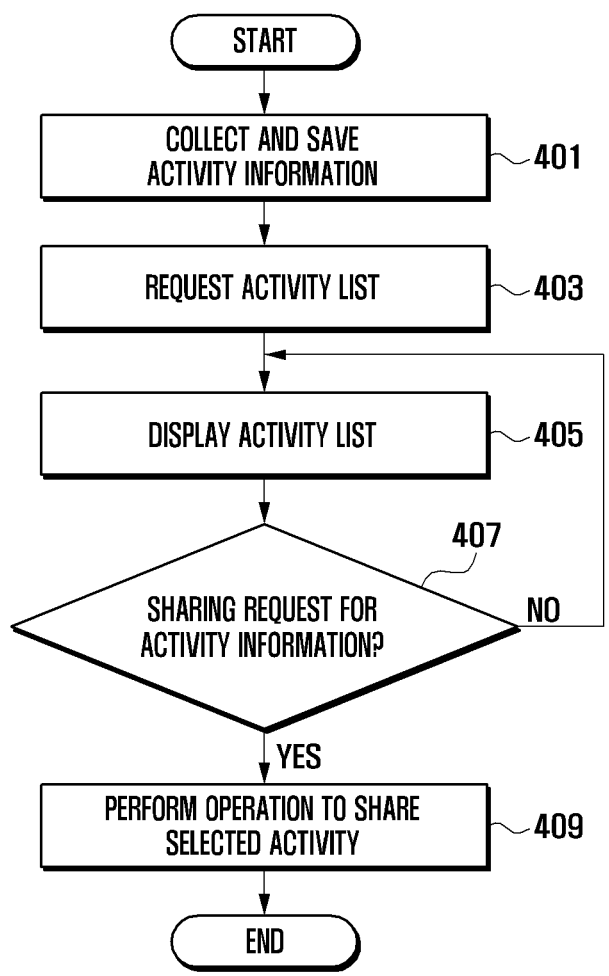
FIG. 4 is a flowchart illustrating a method for activity sharing of a device according to an embodiment of the present invention.
Figure 5:
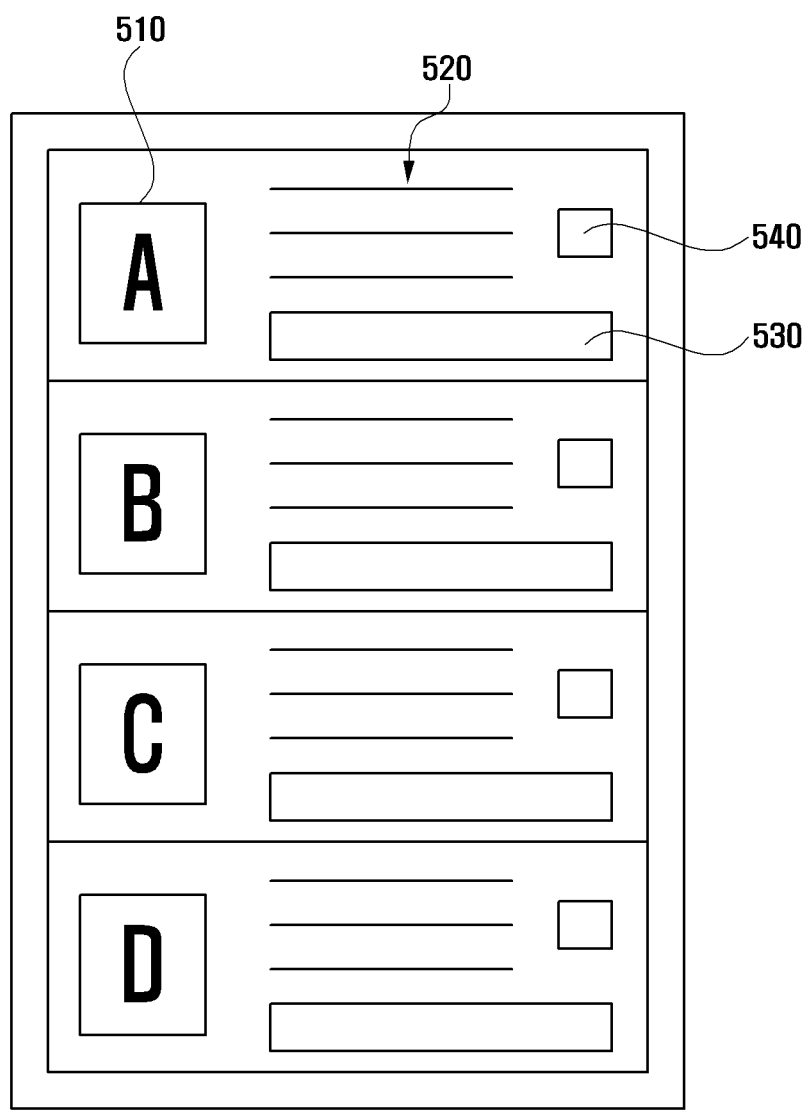
FIG. 5 is a diagram illustrating a user interface screen provided by a device for activity sharing according to an embodiment of the present invention.

FIG. 4 is a flowchart illustrating a method for activity sharing of a device according to an embodiment of the present invention. FIG. 5 is a diagram illustrating a user interface screen provided by the device for activity sharing where the method of FIG. 4 may be carried out by the first device 100 or the second device 300.

Referring to FIG. 4, the control unit 140 of a device collects information on user activities and stores the collected activity information in step 401. Activity information may be related to activities performed by the user in the course of using the device such as actions associated with execution of applications, access to websites, playback or viewing of media, and creation or acquisition of content. Collected activity information may be stored. Activity information may be collected in various ways. For example, the control unit 140 may collect information regarding all activities, some activities meeting preset conditions, or activities selected by the user.

The control unit 140 receives a request for an activity list from the user in step 403 and displays an activity list in step 405. For example, in response to a user request, the control unit 140 displays an activity list using a list format, a slide show feature or icons based on collected activity information. The activity list may include both activity information collected in the device and shared activity information provided by another device. Display of an activity list is illustrated in FIG. 5.

In FIG. 5, the activity list is represented in a list format. The activity list is composed of a first item 510 identifying an activity, a second item 520 describing the activity, a third item 530 indicating the time (for example, date, day, and hour) and location of activity execution, and a fourth item 540 supporting sharing of multiple activities. When a user interface menu enabling selection of multiple activities for sharing is provided, the fourth item 540 may be excluded. The first item 510 may be presented as a thumbnail representing the corresponding activity, the second item 520 and the third item 530 may be presented as text, and the fourth item 540 may be presented as an icon. The above items may be presented in other formats depending on user interface types.

Although not illustrated in FIG. 5, an activity list may include not only activity information collected in the device but also shared activity information provided by another device. Such an activity list including activity information provided by another device is described below.

Referring back to FIG. 4, the control unit 140 checks whether a sharing request is received from the user in step 407. For example, the control unit 140 may check reception of a sharing request after at least one activity is selected from the activity list.

When a sharing request is not received, the control unit 140 returns to step 405 and continues display of the activity list. When a sharing request is received, the control unit 140 performs an operation to share the selected activity in step 409. For example, the control unit 140 creates a sharing message containing information on the selected activity and sends the sharing message to the server 200. When the communication module 110 is turned off, the control unit 140 may turn on the communication module 110. Then, the control unit 140 turns off the communication module 110 after sending the activity information to the server 200.

Although not illustrated in FIG. 4, in sending activity information to be shared, the sharing message may include target sharer information specifying a sharing user who is allowed to share the activity information. The target sharer information may be set by the user to specify a category of sharing users covering a specific user ("friendship" relation), a group of users ("group" relation) or all other users ("open" relation) with respect to a relationship with the user of the device. That is, activity information in a sharing message may be shared with a friend, a group of users or by all other users. The server 200 receiving a sharing message may grant rights to access the activity information therein to sharing users indicated by the target sharer information therein. When target sharer information is pre-registered in the server 200, it may be omitted from a sharing message to be sent to the server 200.

In FIG. 4, activity information is provided to the server 200 in response to a user request. According to another embodiment of the present invention, whenever new activity information is collected, the device may automatically send the collected activity information to the server 200. The device may take current network conditions into account to automatically send activity information to the server 200. For example, when connectable only to a fee-charging network like a mobile communication network, the device may send collected activity information in a preset way or notify the user of network conditions and wait for user decision and when connectable to a free-of-charge network like a Wi-Fi network, the device may send collected activity information to the server 200.

In FIG. 4, activity information is sent to the server 200. According to another embodiment of the present invention, a device may share activity information directly with another device. That is, activity information may be shared between devices without a server through direct communication between the devices.

Figure 6:
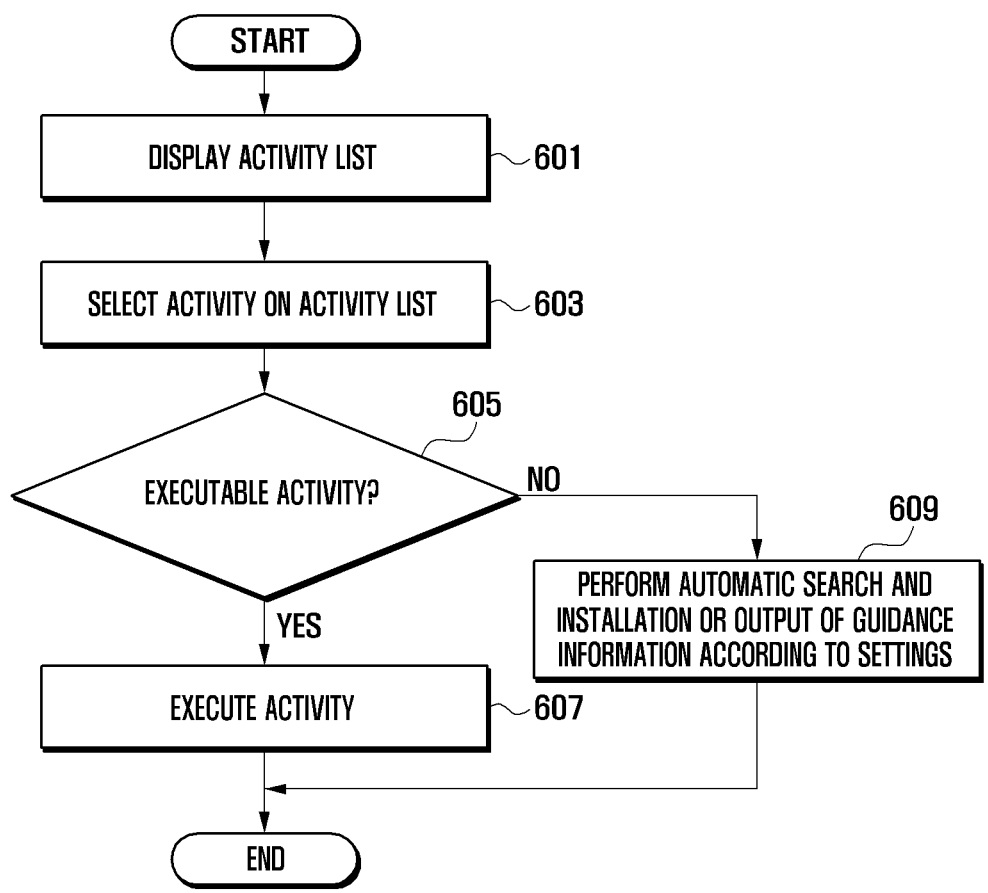
FIG. 6 is a flowchart illustrating a procedure for handling events on a shared activity in a device according to an embodiment of the present invention.

FIG. 6 is a flowchart illustrating a procedure for handling events on a shared activity in a device, as carried out by the first device 100 or the second device 300.

Figure 7:
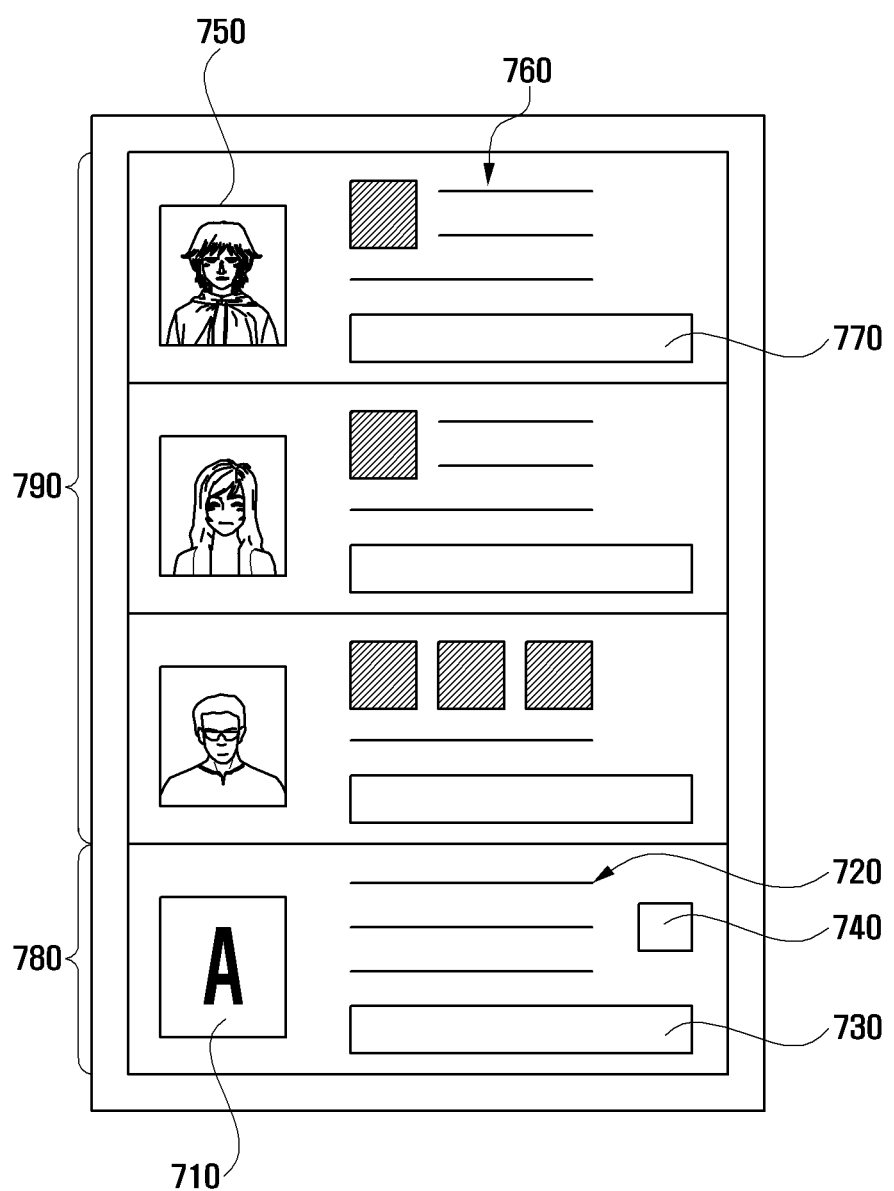
FIG. 7 is a diagram illustrating a user interface screen provided by a device for listing shared activities according to an embodiment of the present invention.

Referring to FIG. 6, the control unit 140 displays an activity list using a list format, a slide show feature or icons in response to a user request in step 601. The control unit 140 may create an activity list composed of both activity information collected in the device and shared activity information provided by another device. Display of such an activity list is illustrated in FIG. 7 (described below).

The control unit 140 detects selection of an activity on the activity list in step 603. The user may select an entry of the activity list and enter a command for executing the selected entry.

When selection of an activity is detected, the control unit 140 determines executability of the selected activity in step 605. To determine executability of an activity, the control unit 140 may identify the type of the activity by checking whether the activity is related to an application intended for execution or is related to content intended for playback.

For example, when the selected activity is related to an application intended for execution, the control unit 140 checks whether an application associated with the selected activity is present in the device. When an application associated with the selected activity is present, the control unit 140 determines that the selected activity is executable and when an application associated with the selected activity is not present, the control unit 140 determines that the selected activity is not executable.

When the selected activity is related to content intended for playback, the control unit 140 determines executability of the selected activity depending on the availability of a player application capable of playing back the content indicated by the selected activity. The control unit 140 may check whether a player associated with the selected activity is present in an external device having provided the corresponding activity information. When a player associated with the selected activity is present, the control unit 140 determines that the selected activity is executable and when a player associated with the selected activity is not present, the control unit 140 determines that the selected activity is not executable.

When the selected activity is determined to be executable, the control unit 140 executes the selected activity and displays execution results on the display unit 120 in step 607.

When the selected activity is determined not to be executable, the control unit 140 may perform a preset function such as automatic search and installation or output of guidance information in step 609. For example, when automatic search and installation is set, the control unit 140 automatically searches an external server (such as a market server) for an entity like an application or player associated with the selected activity, downloads the found entity, and installs the downloaded entity. After installation, the control unit 140 executes the selected activity or notifies the user of completion of installation.

Figure 8:
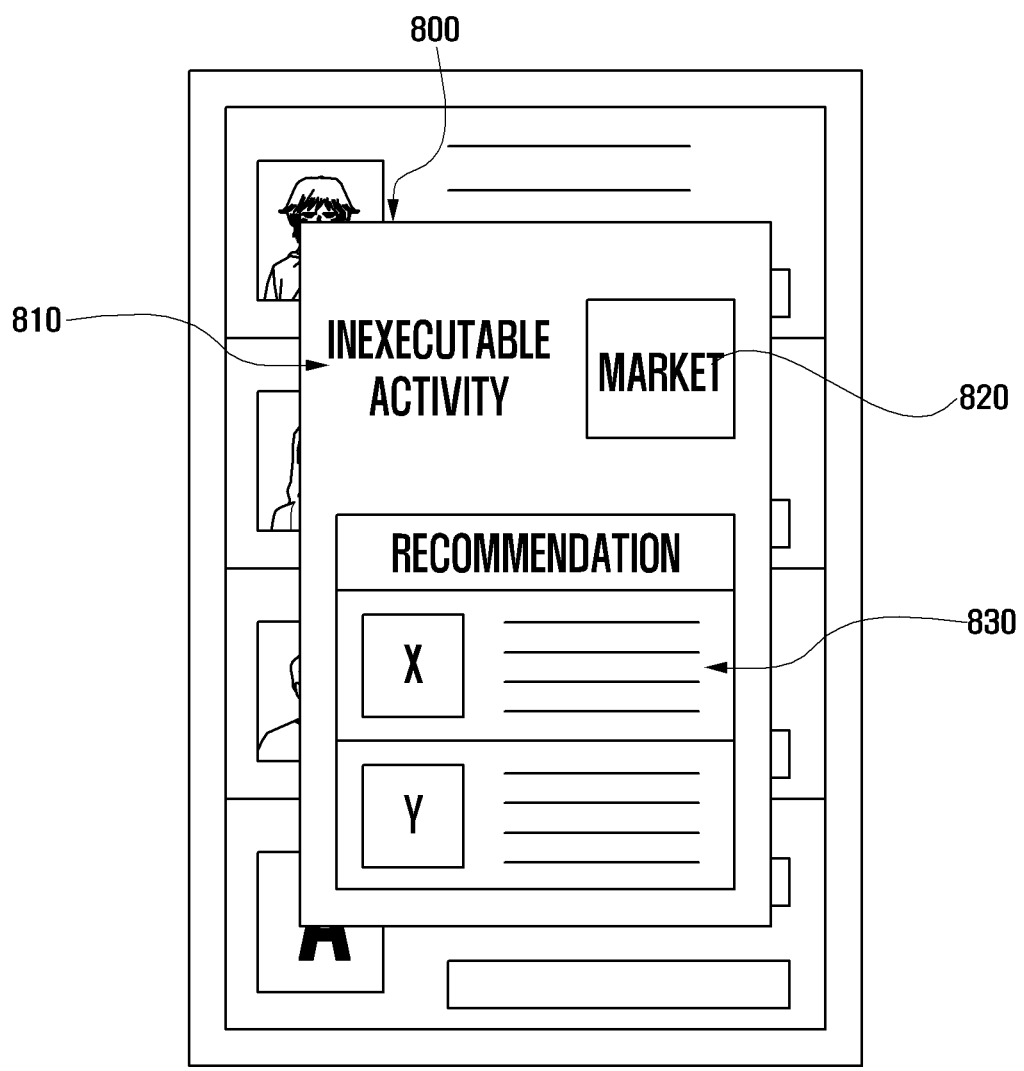
FIG. 8 is a diagram illustrating a user interface screen provided by a device for handling an event on a shared activity according to an embodiment of the present invention.

When output of guidance information is set, the control unit 140 may provide information related with the selected activity through a preset user interface feature. The control unit 140 may provide information necessary for obtaining an application or player associated with the selected activity (for example, application market information) or recommendation information for a similar application or player. Such information may be output through a popup window. After output of guidance information, the control unit 140 may perform an operation according to user selection. For example, when the user makes an acquisition request for an entity like an application or player associated with the activity, the control unit 140 connects to a corresponding external server, downloads the requested entity, and installs the downloaded entity. A user interface implementing this feature is illustrated in FIG. 8 and described in reference therewith below.

Although not illustrated in FIG. 6, when an activity is selected from the activity list, the device may determine executability of the selected activity in consideration of the activity type. When the selected activity is executable, the device executes the selected activity and when the selected activity is not executable, the device performs a preset function or output information related with the activity.

When the selected activity is related to an application or media content (activity type), the device determines executability of the activity and performs subsequent operations in a manner described above.

When the selected activity is related to broadcast content such as broadcast channels or broadcast programs, the device determines executability of the selected activity depending upon availability of a broadcast reception function. When the device supports a broadcast reception function, the device determines that the selected activity is executable, and receives and reproduces a broadcast according to a broadcast channel or program indicated by the selected activity. When the device does not support a broadcast reception function, the device determines that the selected activity is not executable and outputs an error notification through a popup window.

For example, when the device is a refrigerator, when the selected activity is related to placing food in or removing food from the refrigerator, the device determines executability of the selected activity depending upon availability of a specific function such as recipe provision or food storage management. When a necessary function is available, the device determines that the selected activity is executable and performs the function based on information provided by the selected activity (for example, providing a combined recipe, providing information on management of food ingredients). When a necessary function is unavailable, the device determines that the selected activity is not executable and performs a detailed search for relevant information on the activity or outputs information for obtaining an application or content associated with execution of the activity through a popup window.

FIG. 7 is a diagram illustrating a user interface screen provided by a device for listing shared activities.

In FIG. 7, an activity list is represented in a list format. According to one embodiment of the present invention, the activity list is divided into a user region 780 for presenting activity information collected from the device, and a sharer region 790 for presenting shared activity information provided by other users. Although the user region 780 and sharer region 790 are depicted as being clearly separated in FIG. 7, activity information elements of the activity list may be presented in order of collection or acquisition times (i.e., user regions 780 and sharer regions 790 may be mixed randomly). One of the user region 780 and the sharer region 790 may be presented according to a sorting request of the user.

In the user region 780, activity information is composed of a first item 710 identifying an activity, a second item 720 describing the activity in brief, a third item 730 indicating the time (for example, date, day, and hour) and location of activity execution, and a fourth item 740 supporting sharing of multiple activities. When a user interface menu enabling selection of multiple activities for sharing is provided, the fourth item 740 may be excluded.

In the sharer region 790, activity information includes a fifth item 750 identifying a sharing user sharing the activity, a sixth item 760 identifying and describing the shared activity in brief, and a seventh item 770 indicating the time (for example, date, day, and hour) and location of activity execution by another device. The sixth item 760 of the sharer region 790 may be separated into an item identifying the shared activity and another item describing the shared activity in brief as in the case of the first item 710 and the second item 720 of the user region 780. The item identifying a shared activity may be presented multiple times according to the number of sharers.

Although the activity list is depicted as including both the user region 780 and the sharer region 790 in FIG. 7, the activity list may be presented as including one of the user region 780 and the sharer region 790. That is, an activity list may be separately presented using a first list composed of activity information collected in the device and a second list composed of shared activity information provided by other devices.

FIG. 8 is a diagram illustrating a user interface screen provided by a device for handling an event on a shared activity. In FIG. 8, activity related information (described in FIG. 6) is provided in a popup window.

As illustrated in FIG. 8, activity related information is provided in a popup window 800 on the current screen (for example, an activity list screen). The popup window 800 includes an acquisition information region 810 and a recommendation information region 830.

In the acquisition information region 810, a notification indicating inexecutability of a selected activity and an item 820 supporting direct access to an external server, from which an entity associated with the selected activity may be obtained, may be provided. In the recommendation information region 830, information recommending a similar or higher version entity as associated with a selected activity may be provided.

When a shared activity provided by another user is not executable by the device, the user may use activity related information presented in the popup window 800 to obtain and install an entity associated with the shared activity or a recommended entity. Hence, the user may readily execute a shared activity provided by another user.

Figure 9:
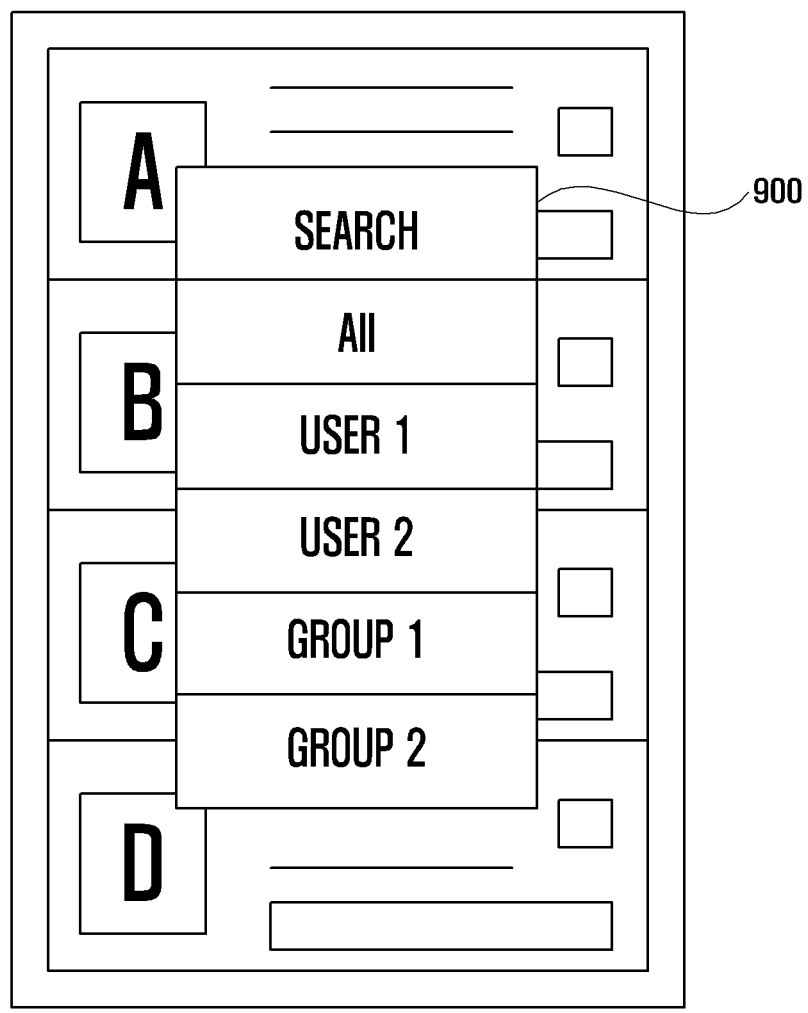
FIGS. 9 and 10 are diagrams illustrating user interface screens provided by a device to support activity sharing according to an embodiment of the present invention.

FIG. 9 is a diagram illustrating a user interface screen provided by a device to support activity sharing.

FIG. 9 is a diagram illustrating a user interface feature for specifying target sharer information to initiate sharing of information on at least one selected activity. That is, the user interface screen in FIG. 9 may be used to specify sharing users allowed to access the activity information selected by a particular user.

When an activity list is presented as in FIG. 5, the user selects an activity from the activity list and requests activation of a sharing function by entering a menu item (like a share button based on a hard key or soft key) or a touch interaction. In response to the request, the control unit 140 provides a popup window 900 for specifying sharing users allowed to access the selected activity information.

The popup window 900 may be of a drop-down menu type or a scroll menu type. The popup window 900 includes a search item ("Search") to find sharing users, an open item ("All") to allow all SNS users to access the activity information, at least one registered user item ("User 1", "User 2") to allow one or more pre-registered users to access the activity information, at least one registered group item ("Group 1", "Group 2") to allow one or more pre-registered groups of users to access the activity information, and a registration item (not illustrated) to register a sharing user or a group.

The user may use the popup window 900 to specify a category of sharing users allowed to share activity information. That is, the user may grant rights to access shared activity information to other SNS users depending on the relationship with the user. For example, the user may specify a category of sharing users covering a specific user ("friendship" relation), a group of users ("group" relation) or all other users ("open" relation). For transmission, information regarding a category of sharing users specified in the popup window 900 may be used as target sharer information in the data field 1330 of a sharing message.

Figure 10:
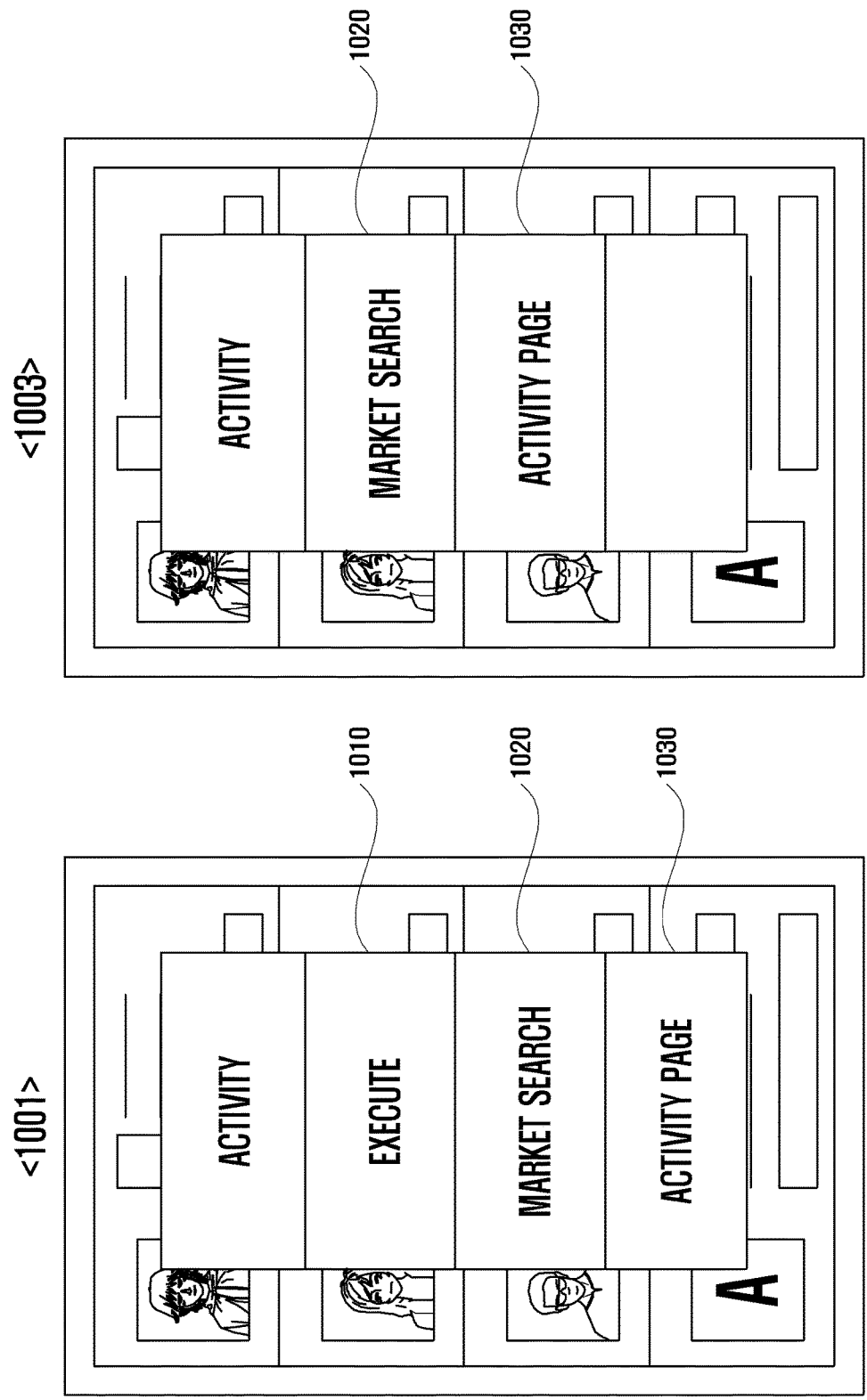

FIG. 10 is a diagram illustrating another user interface screen provided by a device to support activity sharing according to the present invention.

The user interface feature in FIG. 10 enables a user to select an event on a shared activity (provided by another user) of an activity list.

When an activity list is presented as in FIG. 7, the user may select an activity from the activity list. Then, as described above in reference to FIG. 8, the device may check executability of the selected activity, and execute the selected activity when the selected activity is executable or provide activity related information through a popup window 800 when the selected activity is inexecutable. Alternatively, as illustrated in FIG. 10, the device may determine executability of the selected activity, and provide options to handle events on the selected activity through a popup window as indicated by reference symbols 1001 and 1003 according to determined executability.

Reference symbol 1001 indicates options selectable when the selected activity is executable, and reference symbol 1003 indicates options selectable when the selected activity is inexecutable.

When the selected activity is executable, as indicated by reference symbol 1001, the device provides an execute item 1010 to execute the activity, a search item 1020 to search an external server (market server) for a similar activity, a recommended activity or a higher version activity, and an information item 2030 to output detailed information on the activity in a separate page.

When the selected activity is inexecutable, as indicated by reference symbol 1003, the device provides a search item 1020 and an information item 2030 (without an execute item 1010). The search item 1020 may support a search for the selected activity first.

Figure 11:
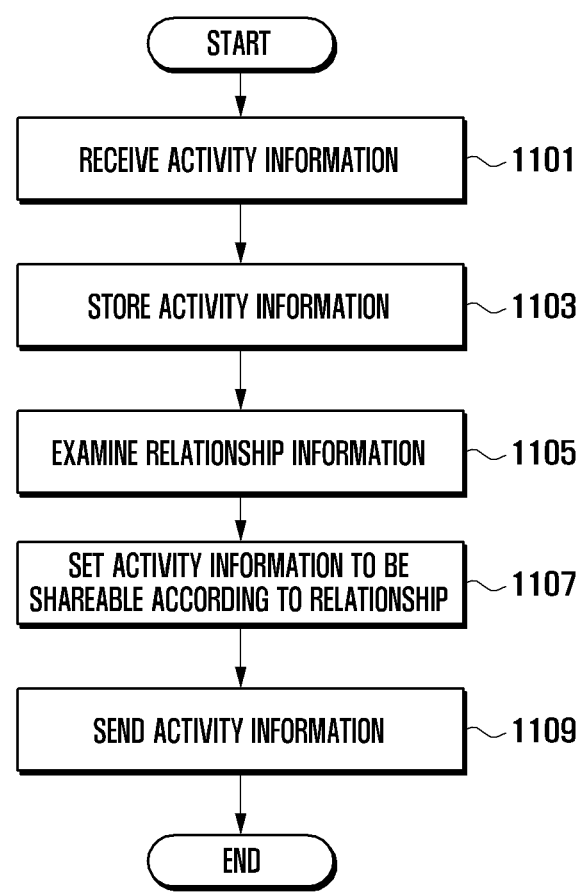
FIG. 11 is a flowchart illustrating a method for activity sharing of a server according to another embodiment of the present invention.

FIG. 11 is a flowchart illustrating a method for activity sharing of the server 200 according to another embodiment of the present invention.

Referring to FIG. 11, the server 200 receives activity information for sharing from at least one user in step 1101, and stores the received activity information in step 1103. Specifically, the server 200 may receive sharing messages containing activity information from various devices on a social network. The server 200 parses a received sharing message to extract activity information and stores the extracted activity information. As described above, the sharing message may contain target sharer information that specifies a category of sharing users allowed to access the activity information.

The server 200 identifies target sharer information set by the user providing the activity information in step 1105. As described above, the target sharer information may be provided through the sharing message containing the activity information or be pre-registered for each user in the server 200.

The server 200 sets the activity information to be shareable according to the target sharer information in step 1107. The server 200 may grant a right to access the activity information to sharing users indicated by the target sharer information. For example, the server 200 may use the target sharer information to grant a right to access the activity information to a category of sharing users covering a specific user ("friendship" relation), a group of users ("group" relation) or all other users ("open" relation) with respect to a relationship with the user providing the activity information.

The server 200 delivers the shared activity information to devices of sharing users indicated by the target sharer information in a pull scheme or a push scheme in step 1109. That is, the server 200 may send the shared activity information to a device of a sharing user in response to a request from the device (pull scheme). Alternatively, whenever newly shared activity information arrives, the server 200 may automatically send the shared activity information to sharing users indicated by the target sharer information (push scheme).

Although not illustrated in FIG. 11, the server 200 may derive various statistics regarding activities based on various activity information shared by SNS users, and provide statistical information and recommendation information. The server 200 may perform statistical analysis on the shared activity information related to users, groups, services and locations, and provide customized activity information based on the analysis results. For example, for a given user, the server 200 may provide information on shared activities most frequently used by friends of the user, by all other users, or at a specific location. The server 200 may identify activities preferred by a specific user and provide customized recommendation information to the user.

Figure 12:
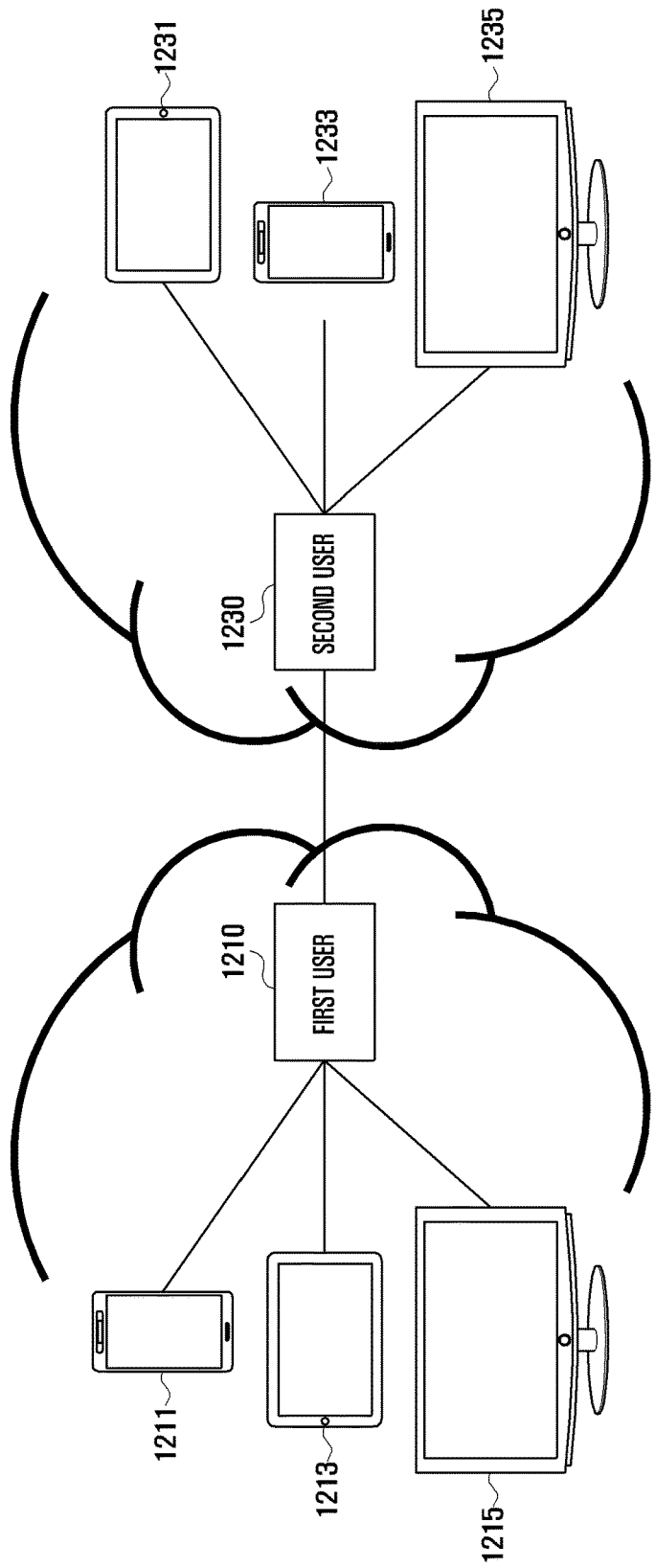
FIG. 12 is a diagram illustrating a relationship between users and devices during activity sharing in a social network according to an embodiment of the present invention.

FIG. 12 is a diagram illustrating a relationship between users and devices during activity sharing in a social network.

In FIG. 12, a first user 1210 shares activity information with a second user 1230, where the first user 1210 and the second user 1230 are friends or members of a group. This indicates that sharing of activity information is performed not between devices but between users.

As illustrated in FIG. 12, each user may own multiple devices (for example, a smart phone, tablet PC, PDA or smart TV) and generate activities in the course of using the multiple devices. Activity information collected by one device of a first user may be available to all devices of a second user having a specific relationship with the first user through activity sharing.

For example, when the first user 1210 and the second user 1230 are in a friendship relation, the first user 1210 may utilize a device 1211, device 1213 and device 1215, and the second user 1230 may utilize a device 1231, device 1233 and device 1235. As the first user 1210 uses the devices 1211 to 1215, each of the devices 1211 to 1215 may collect activity information and provide the activity information for sharing to the second user 1230 indicated by target sharer information set by the first user 1210.

Then, the second user 1230 may use any of the devices 1231, 1233 and 1235 to view shared activity information provided by the devices 1211, 1213 and 1215 of the first user 1210. According to one embodiment of the present invention, activity information collected by one device of a first user may be available to multiple devices of a second user having a specific relationship with the first user through sharing of activity information between users.

According to an embodiment of the present invention, after activity information collected by one device (for example, device 1211) of the first user 1210 is sent to the server 200, the activity information is made available to the remaining devices (for example, devices 1213 and 1215) of the first user 1210. Hence, when a user owns multiple devices, the user may identify activities performed on multiple devices using a single device.

According to embodiments of the present invention, the method and system enable a user utilizing a device to conveniently and effectively share activities with other users (friends, group members or general users) through social network services. According to one embodiment of the present invention, a device of a user may automatically collect and store information on all activities of the user in the course of utilizing the device and provide an activity list based on the stored activity information to the user upon request. The device may share one or more activities selected by the user from the activity list with other users through social network services. Specifically, the user may identify an activity (provided by a second user associated with the user) shared through a social network service, and perform the shared activity using the device or conveniently install an associated entity in the device without a separate process like a search.

The method and system of the present invention enable sharing of various SNS-based user activities in an easy way and enable a shared activity to be directly performed by a user device or readily installed therein. As shared activities are provided and used by other users associated with a user, the user may trust the credibility of the shared activities. Hence, activity sharing may contribute to vitalization of social network services.

The activity sharing method according to the present invention may be implemented in various types of devices or appliances, providing optimal environments for activity sharing and related supplementary features. The activity sharing method enables devices to share activities in an easy and efficient way. Thereby, it is possible to increase user convenience and enhance device usability and competitiveness.

According to the present invention, the method for sharing activities of devices may be implemented as computer programs and may be stored in various computer readable storage media. The computer readable storage media may store program instructions, data files, data structures and combinations thereof. The program instructions may include instructions developed specifically for the present invention and existing general-purpose instructions.

The computer readable storage media may include magnetic media such as a hard disk and floppy disk, optical media such as a CD-ROM and DVD, magneto-optical media such as a floptical disk, and memory devices such as a ROM and RAM. The program instructions may include machine codes produced by compilers and high-level language codes executable through interpreters.

Although various embodiments of the present invention have been described in detail herein, many variations and modifications may be made without departing from the spirit and scope of the present invention as defined by the appended claims.

What is claimed is:

1. A device, comprising:
   a communication interface;
   a display; and
   a processor configured to:
      control the communication interface to receive activity information from an external server, wherein the activity information includes information about one or more actions made in one of a plurality of application by one or more users in a sharing relationship with a user of the device;
      in response to an input indicating a user request for an activity list of shared activity information, generate a graphical user interface including at least one activity information element, each of the at least one activity information element corresponding to an activity by a specific user, wherein the activity information element includes an identification of the specific user, a description of the activity, and information associated with a time of the activity;
      control the display to display the graphical user interface;
      receive a selection by user input of an activity information element displayed on the graphical user interface;
      determine whether an application relating to the activity corresponding to the selected activity information element is executable by the device;
      execute the application relating to the activity corresponding to the selected activity information element, when the application is executable by the device; and
      provide information to the user recommending a similar or higher version entity corresponding to the selected activity information element, when the application is inexecutable by the device,
   wherein the specific user is one of the user and the one or more users in a sharing relationship with the user.

2. The device of claim 1, wherein each activity information element is shown in order of execution or termination of its corresponding activity in the graphical user interface.

3. The device of claim 2, wherein the information associated with a time of the activity indicates time elapsed from the execution or termination of the activity.

4. The device of claim 1, wherein the processor provides information for the user to obtain the application by generating a display item supporting direct access to an external server from which the application can be obtained.

5. The device claim 1, wherein the processor is further configured to:
   search an external server to download the application, when the application is inexecutable by the device; and
   automatically download the application from the searched external server.

6. The device of claim 1, wherein the processor is further configured to:
   control the communication interface to receive activity information from another device which shares activity information with the device.

7. The device of claim 1, wherein the processor is further configured to control the communication interface to receive statistical information regarding activities of various user, and control the display to display the received statistical information.

8. A method for displaying activities on a device, the method comprising:
   receiving activity information from an external server, wherein the activity information includes information about one or more actions made in one of a plurality of application by one or more users in a sharing relationship with a user of the device;
   in response to an input indicating a user request for an activity list of shared activity information, generating a graphical user interface including at least one activity information element, each of the at least one activity information element corresponding to an activity by a specific user, wherein the activity information element includes an identification of the specific user, a description of the activity, and information associated with a time of the activity;
   displaying the graphical user interface on the device;
   receiving a selection by user input of an activity information element displayed on the graphical user interface;
   determining whether an application relating to the activity corresponding to the selected activity information element is executable by the device;
   executing the application relating to the activity corresponding to the selected activity information element, when the application is executable by the device; and
   providing information to the user recommending a similar or higher version entity corresponding to the selected activity information element, when the application is inexecutable by the device,
   wherein the specific user is one of the user and the one or more users in a sharing relationship with the user.

9. The method of claim 8, wherein the information associated with a time of the activity indicates time elapsed from the execution or termination of the activity.

10. The method of claim 8, wherein providing information comprises:
    generating and displaying an item supporting direct access to an external server from which the application can be obtained.

11. The method of claim 8, wherein handling the event comprises:
    searching an external server to download the application, when the application is inexecutable by the device; and
    automatically downloading the application from the searched external server.

12. The method of claim 8, further comprising:
    receiving activity information from another device which shares activity information with the device.

13. The method of claim 8, wherein the received activity information further includes statistical information regarding activities of various users, and the method further comprises:
    displaying the statistical information on the device.

* * * * *